United States Patent
Matsuura et al.

(10) Patent No.: US 6,935,194 B2
(45) Date of Patent: Aug. 30, 2005

(54) DUAL RESOLVER DEVICE

(75) Inventors: Mutsumi Matsuura, Tokyo (JP); Taiichi Miya, Tokyo (JP)

(73) Assignee: Minebea Co., Ltd., Nagano-ken (JP)

( * ) Notice: Subject to any disclaimer, the term of this patent is extended or adjusted under 35 U.S.C. 154(b) by 1 day.

(21) Appl. No.: 10/392,971

(22) Filed: Mar. 21, 2003

(65) Prior Publication Data

US 2004/0041677 A1 Mar. 4, 2004

(30) Foreign Application Priority Data

Mar. 25, 2002 (JP) ........................................ 2002-084190

(51) Int. Cl.[7] ............................................... G01L 3/02
(52) U.S. Cl. ................................................ 73/862.326
(58) Field of Search ....................... 73/862.08, 862.192, 73/862.326

(56) References Cited

U.S. PATENT DOCUMENTS

| | | | |
|---|---|---|---|
| 4,672,347 A | 6/1987 | Garcia et al. | ............... 336/132 |
| 4,954,763 A | 9/1990 | Kumar et al. | ............... 318/605 |
| 5,644,224 A | 7/1997 | Howard | ...................... 324/165 |
| 6,331,759 B1 | 12/2001 | Atmur | ......................... 318/661 |
| 6,369,686 B1 * | 4/2002 | Pielok | ......................... 336/234 |
| 6,554,303 B2 * | 4/2003 | Benz et al. | ................. 280/93.5 |

* cited by examiner

Primary Examiner—Max Noori
(74) Attorney, Agent, or Firm—Adduci, Mastriani & Schaumberg, L.L.P.

(57) ABSTRACT

A dual resolver device that includes a first resolver having a first rotary shaft, and a second resolver having a second rotary shaft, wherein the absolute value of a difference between a shaft angle multiple of the first resolver and a shaft angle multiple of the second resolver is 1. In one embodiment, the dual resolver device further includes a torsion bar connecting the first and second rotary shafts. In another embodiment, the first and second rotary shafts constitute different portions of the same rotary shaft. In either embodiment, the first resolver preferably produces an output indicative of a rotation angle of the first rotary shaft, and the second resolver preferably produces an output indicative of a rotation angle of the second rotary shaft. The dual resolver device preferably further includes a processor that determines an absolute shaft rotation angle in response to the first and second outputs, and the shaft angle multiples of the first and second resolvers. Most preferably, the processor has the capability of determining both the absolute and relative shaft rotation angles in response to the first and second outputs, and the shaft angle multiples of the first and second resolvers.

19 Claims, 5 Drawing Sheets

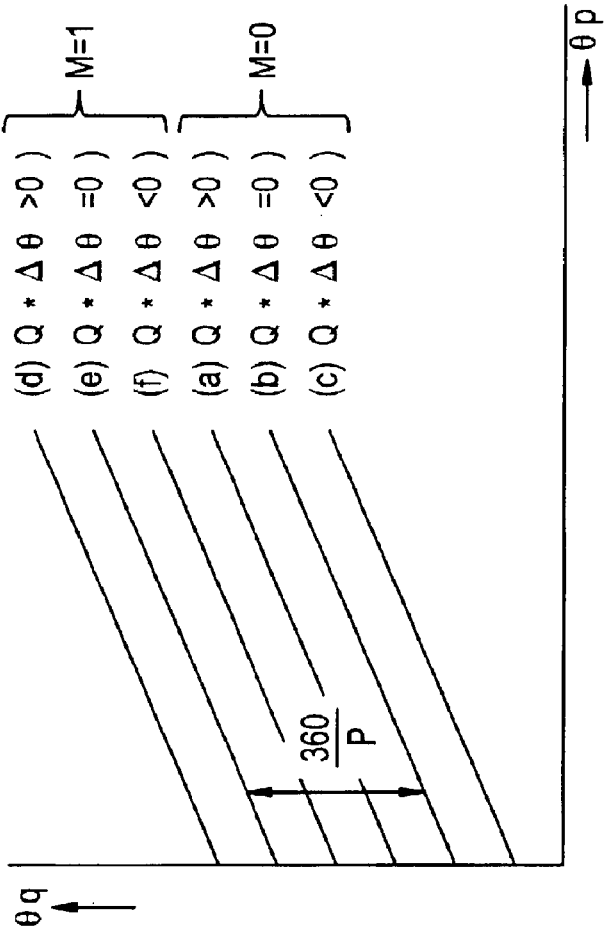

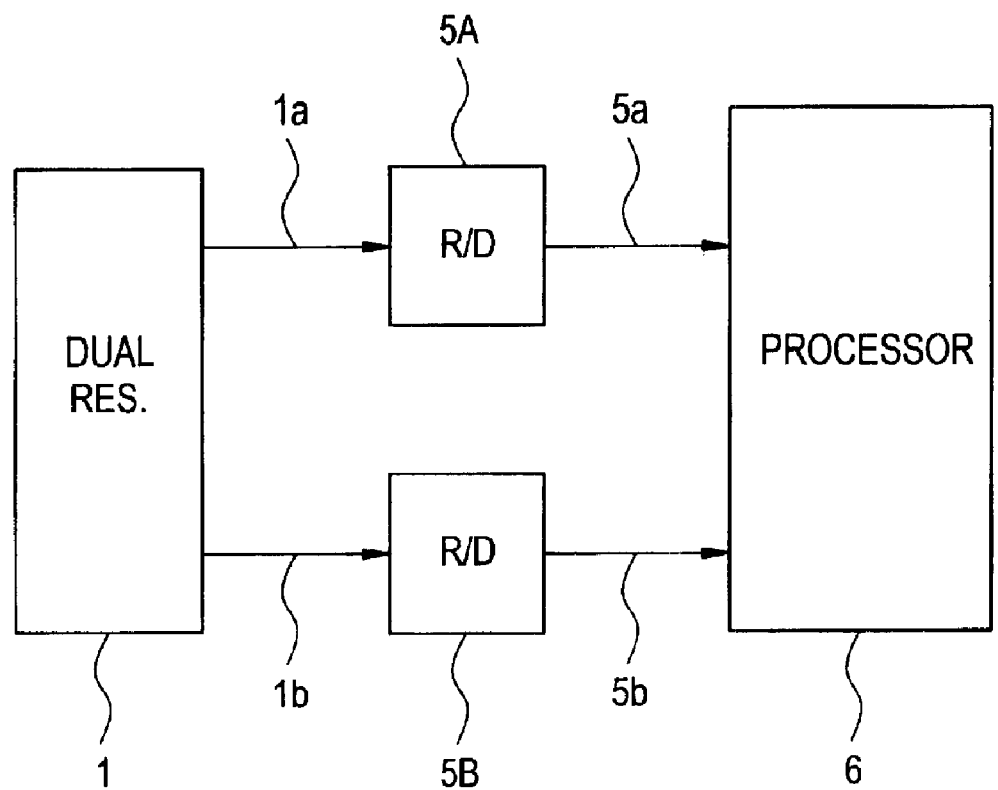

DUAL RESOLVER DEVICE

BACKGROUND OF THE INVENTION

In general, road vehicles such as automobiles are steered by means of an operator (driver) rotating a steering wheel (handwheel), which, in turn, causes rotation of wheels (roadwheels) that are in contact with a road surface. The roadwheels are operatively coupled to the handwheel via a steering shaft. Due to frictional forces between the roadwheels and the road surface, the roadwheels generally do not rotate to the same extent as the steering wheel rotates. Consequently, more than one turn (i.e., complete revolution) of the handwheel is generally needed in order to move the roadwheels from lock to lock. The difference in the rotation angles of the handwheel and roadwheels results in the generation of torque. Torque sensors have been developed to measure the difference in rotation angles between the handwheel and the roadwheels. Electric power assisted steering systems that incorporate torque sensors have been developed to provide servo control of the steering system in order to minimize the difference in rotation angles between the handwheel and roadwheels, and thereby optimize steering accuracy.

FIG. 6 illustrates a torque sensor of a previously-developed electric power assisted vehicle steering system. As shown in FIG. 6, the system includes, at one end, an input shaft 72 operatively connected to a steering wheel or handwheel 71, and, at the other end, an output shaft 74 operatively connected to at least one roadwheel (not shown). The input shaft 72 and the output shaft 74 are linked by a torsion bar 73 that twists when the handwheel 71 is turned, during steering, by an amount that depends upon the amount of torque generated by the turning action. A first detection ring 66 is installed around the outer surface of the input shaft 72 and rotates by approximately the same angle as the handwheel 71. A second detection ring 67 is installed around the outer surface of the torsion bar 73. A third detection ring 68 is installed around the outer surface of the output shaft 74 and rotates by approximately the same angle as the roadwheels. The detection rings 66–68 are composed of magnetic material.

Toothed portions comprised of spaced-apart teeth are formed on mutually opposing surfaces of the first and second detection rings 66, 67, and similar toothed portions are formed on mutually opposing surfaces of the second and third detection rings 67, 68. A first coil 61 is wound around the outer surface of the first detection ring 66 and the second detection ring 67. The first coil 61 extends across a gap between the first and second detection rings 66, 67. A second coil 70 is wound around the outer surface of the third detection ring 68 and the second detection ring 67. The second coil 70 extends across a gap between the third and second detection rings 68, 67. The first and second coils 61, 70 are each operatively connected to a processor 69.

In operation, the above-described torque sensor of the previously-developed electric power assisted vehicle steering system works as follows. In general, when the operator rotates the steering wheel 71, the input shaft 72, output shaft 74 and torsion bar 73 also rotate. At this time, one end portion of the torsion bar 73, which is joined to the input shaft 72 (i.e., steering wheel side), is twisted to a larger extent than the other end portion of the torsion bar 73, which is joined to the output shaft 74 (i.e., the roadwheel side). Specifically, when the steering wheel 71 is rotated, the rotation angles of the first, second, and third detection rings have the following relationship: rotation angle of first detection ring 66>rotation angle of second detection ring 67>rotation angle of third detection ring 68.

The reason that the rotation angles are increasingly greater towards the steering wheel and away from the roadwheels is that the frictional forces between the roadwheels and the road surface prevent the output shaft 74 from rotating as much as the input shaft 72. Accordingly, the area between the toothed portion of the first detection ring 66 and the toothed portion of the second detection ring 67 varies insignificantly, whereas the area between the toothed portion of the second detection ring 67 and the toothed portion of the third detection ring 68 varies significantly. Consequently, the external magnetic flux between the second detection ring 67 and the third detection ring 68 that is sensed by the second coil 61 varies. The inductance values of the first coil 61 and the second coil 70 are set to be the same, so that when the steering wheel 71 is rotated, the magnetic flux sensed by the first coil 61 is constant, whereas the magnetic flux sensed by the second coil 70 varies. By measuring the change in the induced electromotive force of the second coil 70 with respect to the induced electromotive force of the first coil 61, it is possible to measure the relative rotation angle between the input shaft 72 (steering wheel side) and the output shaft 74 (roadwheel side).

FIG. 7 illustrates a resolver of a previously-developed electric power assisted vehicle steering system. The resolver depicted in FIG. 7 operates on the principle of a rotary transformer. Specifically, this resolver includes a rotary shaft 50, a rotor 54 mounted to the rotary shaft 50, a resolver excitation winding 58 wound around the rotor 54, an inner core 56, and a rotary transformer output winding 60 wound around the inner core 56. The rotor 54 and its associated components are mounted for rotational movement along with rotary shaft 50, within a case 52, by means of bearings 51A and 51B. The system further includes a stator 53, a resolver output winding 57 wound around the stator 53, an outer core 55, and a rotary transformer excitation winding 59 wound around the outer core 55. The stator 53 and its associated components are fixedly mounted to the case 52, so as to remain stationary during rotational movement of the rotary shaft 50.

An excitation voltage applied to the rotary transformer excitation winding 59 induces a voltage in the rotary transformer output winding 60 through the action of the rotary transformer formed by the outer core 55 and the inner core 56. The voltage induced in the rotary transformer output winding 60 is applied to the resolver excitation winding 58. The X-axis (X) and Y-axis (Y) components of the rotation angle of the rotary shaft 50 can be determined from the output of the resolver output winding 57.

However, both of the above-described previously-developed systems suffer from the common limitation that they are capable of measuring only the rotation deviation angle (relative rotation angle) of the rotary shaft, and are not capable of measuring the absolute rotation angle of the rotary shaft, and thus, are not capable of ascertaining the absolute position of the roadwheels.

Based on the above, it can be appreciated that there presently exists a need in the art for a method and apparatus that overcomes the limitations of the existing technology. The present invention fulfills this need in the art.

SUMMARY OF THE INVENTION

The present invention encompasses, among other things, a dual resolver device that includes a first resolver having a first rotary shaft, and a second resolver having a second rotary shaft, wherein the absolute value of a difference between a shaft angle multiple of the first resolver and a shaft angle multiple of the second resolver is 1. In one embodiment, the dual resolver device further includes a torsion bar connecting the first and second rotary shafts. In another embodiment, the first and second rotary shafts constitute different portions of the same rotary shaft. In either embodiment, the first resolver preferably produces an output indicative of a rotation angle of the first rotary shaft, and the second resolver preferably produces an output indicative of a rotation angle of the second rotary shaft. Further, the dual resolver device preferably further includes a processor that determines an absolute shaft rotation angle in response to the first and second outputs, and the shaft angle multiples of the first and second resolvers. Most preferably, the processor has the capability of determining both the absolute and relative shaft rotation angles in response to the first and second outputs, and the shaft angle multiples of the first and second resolvers. The sum of the shaft angle multiples is preferably $\geq 3$, and, in an illustrative embodiment, is $\geq 11$.

Many other aspects and advantages of the present invention will become apparent from the detailed description, taken in conjunction with the accompanying drawings, illustrating by way of example the principles of the present invention.

BRIEF DESCRIPTION OF THE DRAWINGS

FIG. 3 is a graphical representation of equation (14) including a set of graphs corresponding to different parametric conditions;

FIG. 4 is a table depicting the value of $\Delta\theta$ for different values of P and Q with respect to equation (14);

FIG. 5 is a block diagram of a shaft angle measurement device according to an embodiment of the present invention;

DETAILED DESCRIPTION

Figure 1:
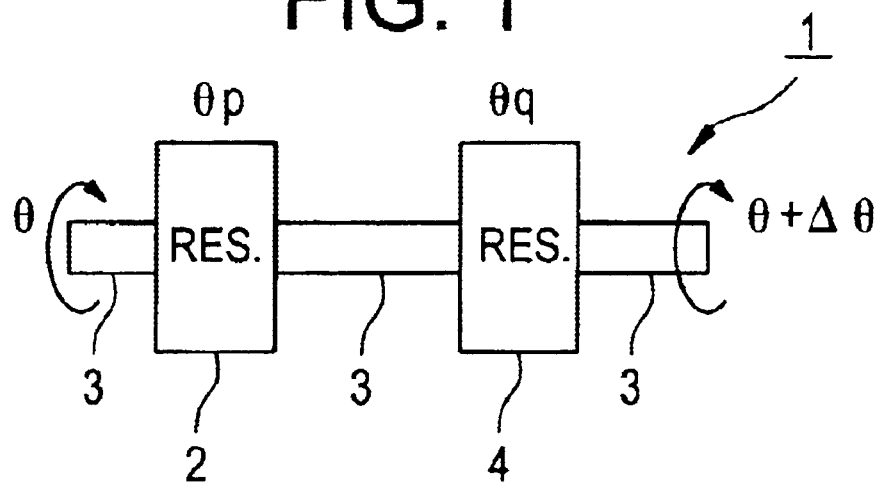
FIG. 1 is a block diagram of a dual resolver of a shaft angle measurement device according to one embodiment of the present invention.
Figure 2:
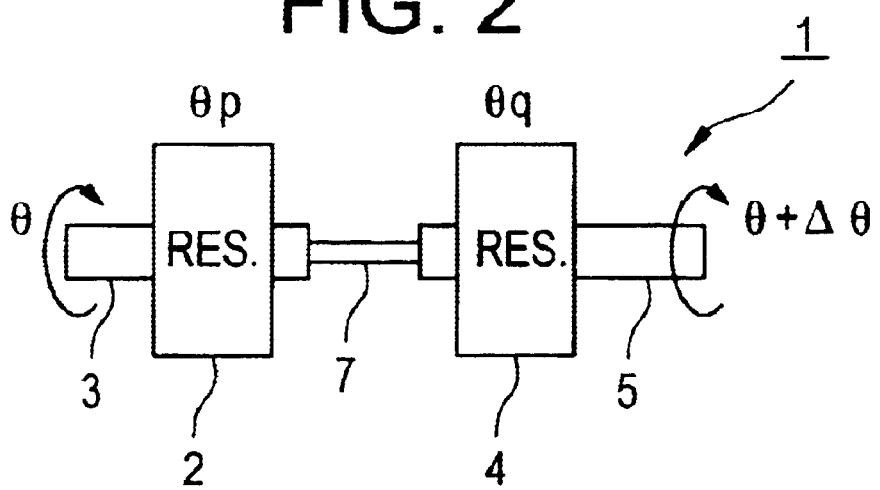
FIG. 2 is a block diagram of a dual resolver of a shaft angle measurement device according to another embodiment of the present invention.
Figure 6:
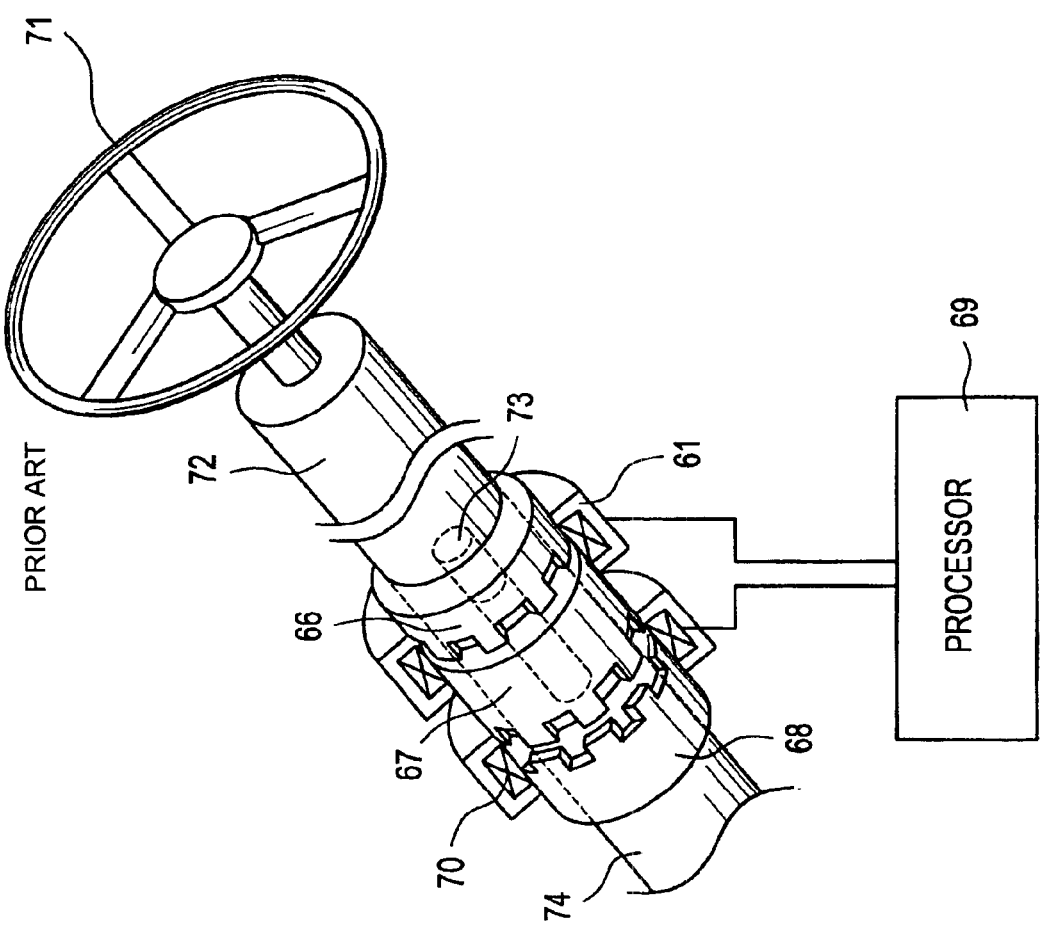
FIG. 6 is a perspective, partial cross-section view of a torque sensor of a previously-developed electric power assisted vehicle steering system; and, FIG. 7 is a perspective, partial cross-section view of a resolver of a previously-developed electric power assisted vehicle steering system.
Figure 7:
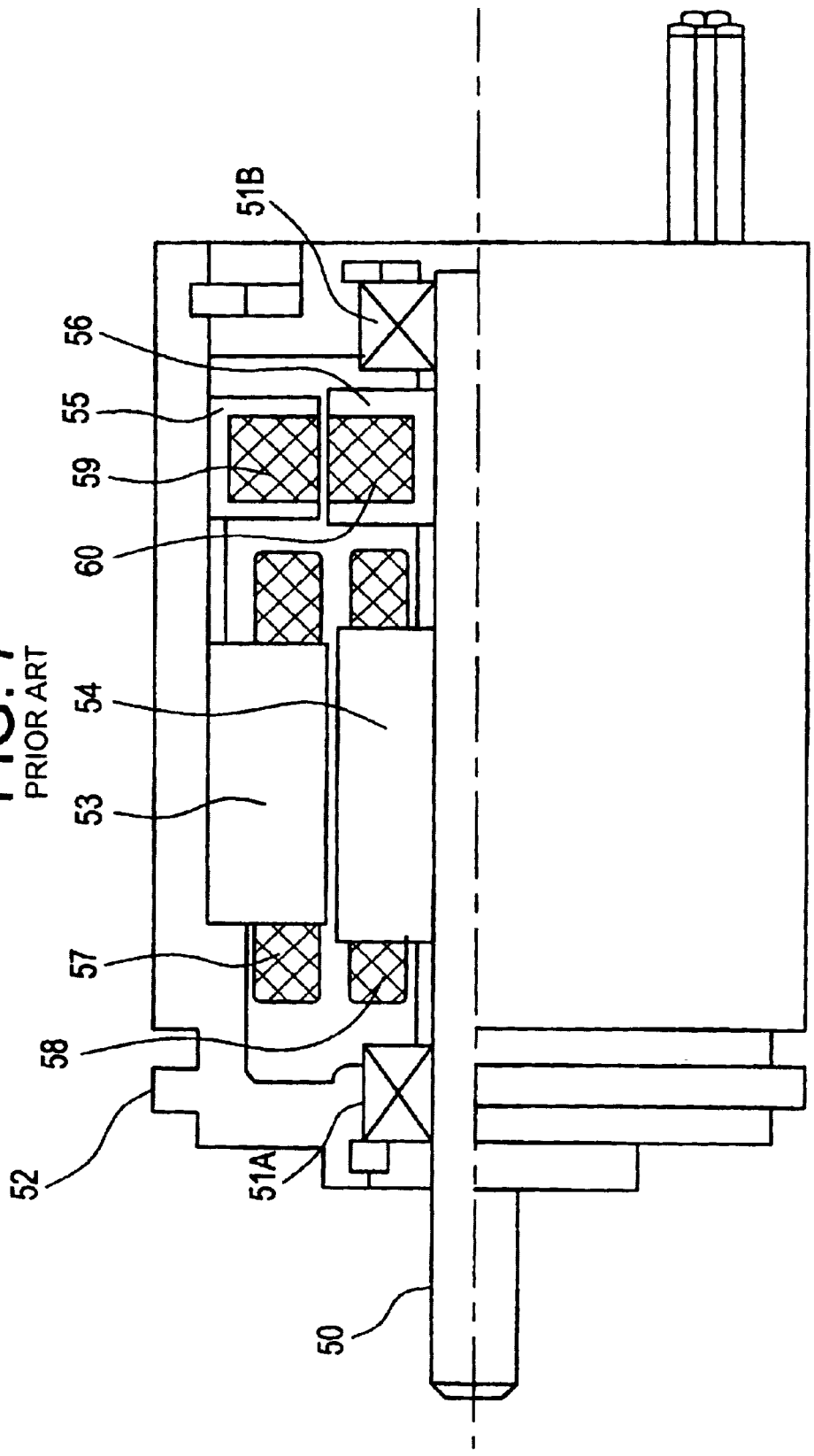

With reference now to FIGS. 1 and 2, first and second embodiments of a dual or twin resolver 1, respectively, are depicted diagrammatically. In overview, it can be seen that with the embodiment depicted in FIG. 1, the dual resolver 1 includes resolvers 2 and 4 that share a common rotary shaft 3. By contrast, with the embodiment depicted in FIG. 2, the dual resolver 1 includes separate rotary shafts 3 and 5 for the resolvers 2 and 4, respectively, wherein the rotary shafts 3 and 5 of the resolvers 2 and 4 are connected by a torsion bar 7.

Resolvers 2 and 4 are suitably of a conventional type well-known in the art. As is well-known to those having ordinary skill in the pertinent art, such conventional resolvers have excitation and output windings, and produce outputs proportional to the sine and cosine of the rotation angle of a rotor. Such conventional resolvers also include an R/D (resolver/digital) converter that produces an output indicative of the respective rotation angle of the rotor of the respective resolver. As shown in FIGS. 1 and 2, the outputs of the R/D converter of the resolvers 2 and 4 are respectively designated $\theta p$ and $\theta q$. Alternatively, the R/D converters can be implemented as separate components of a shaft angle measurement device incorporating the dual resolver 1, as will become apparent hereinafter.

With respect to the first embodiment depicted in FIG. 1, because the resolvers 2 and 4 share the same rotary shaft 3, twisting between resolver 2 and resolver 4 does not occur due to the rigidity of the rotary shaft 3. Thus, the rotation angles $\theta p$ and $\theta q$, of the resolvers 2 and 4, respectively, are always equal (i.e., $\theta p = \theta q$).

With respect to the second embodiment depicted in FIG. 2, because the rotary shafts 3 and 5 are connected by a torsion bar 7, twisting between resolver 2 and resolver 4 does occur due to twisting of the torsion bar 7, thereby causing a difference (designated as $\Delta\theta$, between the respective rotation angles, $\theta p$, $\theta q$, of the resolvers 2 and 4, i.e., $\theta q - \theta p = \Delta\theta$, where $\Delta\theta$ constitutes the relative rotation angle of the rotary shafts 3 and 5 of resolvers 2 and 4. With the first embodiment depicted in FIG. 1, $\Delta\theta = 0$.

The term "shaft angle multiple" as used herein refers to ½ the number of poles of the resolver. The shaft angle multiples of resolver 2 and resolver 4 are referred to herein as P and Q, respectively. The rotation angles of the rotary shafts 3 and 5 of resolvers 2 and 4, respectively, and the respective output rotation angles produced by the R/D converter of the resolvers 2 and 4, are set to $\theta p$ and $\theta q$, respectively. The operation of the second embodiment of the dual resolver 1 of the present invention depicted in FIG. 2 will be described below as follows. First, for the case where $\Delta\theta = 0$, the relationship between the shaft angle multiples P and Q and between the output rotation angles $\theta p$ and $\theta q$ will be described. Second, for the case where $\Delta\theta \neq 0$, the relationship between the shaft angle multiples P and Q and their relationship to the difference $\Delta\theta$ between output rotation angles $\theta p$ and $\theta q$ will be described.

The Case Where $\Delta\theta = 0$

First, for the case where $\Delta\theta = 0$, the relationship between the shaft angle multiples P and Q is determined as follows. The rotation angle $\theta$ of the rotary shaft 3 is expressed by equation (1) when the output rotation angle of resolver 2 with shaft angle multiple P is $\theta p$.

$$\theta = \theta p/P + 360*M/P, \qquad (1)$$

where M is an integer between 0 to (P−1), inclusive.

The rotation angle $\theta + \Delta\theta$ of the rotary shaft 5 is expressed by equation (2) when the output rotation angle of resolver 4 with shaft angle multiple Q is $\theta q$, and a shaft rotation angle difference $\Delta\theta$ is produced by twisting of the torsion bar 7.

$$\theta + \Delta\theta = \theta q/Q + 360* N/Q, \qquad (2)$$

where N is an integer between 0 to (Q−1), inclusive.

When there is no twisting of the rotary shaft 5, $\Delta\theta = 0$, whereby equation (1)=equation (2), and the following equation (3) is obtained:

$$\theta = \theta p/P + 360*M/P = \theta q/Q + 360*N/Q. \qquad (3)$$

The following equations (4) and (5) can be derived from equations (1) and (3) above:

$$\theta p = (P*\theta) + (360*M). \qquad (4)$$

$$\theta q = (Q*\theta) + (360*N). \qquad (5)$$

The following equation (6) can be derived from equation (5) above:

$$(Q-P)*\theta = (\theta q - \theta p) - (360*(M-N)), \qquad (6)$$

where (360* (M−N)) is repeated for each 360° and can therefore be omitted, thereby yielding the following equation (7):

$$\theta = (\theta q - \theta p)/(Q-P). \qquad (7)$$

Based on equation (7), when the value of (Q−P) is set to be 1 (i.e., when Q−P=1), the value of θ can be obtained from θq−θp (i.e., θ=θq−θp, when Q−P=1).

In cases where Q−P=1 is not true, θ can only be obtained up to a range of a maximum of 360°/(Q−P). Therefore, the following equation (8) must be satisfied in order to obtain an absolute angle measurement in the 360° range.

$$Q-P=1. \tag{8}$$

The relationship between the output rotation angles θq and θp is determined as follows. When θp is obtained from equation (3), the following equation (9) is obtained:

$$\theta p = P*\theta q/Q + 360*P*N/Q + 360*M, \tag{9}$$

where 360*M is repeated for each 360° (i.e., for each revolution of the rotary shaft) and can therefore be omitted, whereby equation (9) becomes the following equation (10):

$$\theta p = P*\theta q/Q + 360*P*N/Q. \tag{10}$$

When equation (8) is satisfied, the following equation (11) is obtained:

$$\theta p = P*\theta q/Q + 360*N/Q. \tag{11}$$

When equation (8) is satisfied, θq can be obtained from equation (3) in the same way, yielding the following equation (12):

$$\theta q = P*\theta p/P + 360*M/P. \tag{12}$$

The Case Where Δθ≠0

When θ is eliminated from equations (1) and (2), the relationship between θq and θp, and when there is a Δθ≠0 difference between the rotation angles of the rotary shafts 3 and 5 of the resolvers 2 and 4, respectively, the following equation (13) results:

$$\theta q - Q*\Delta\theta = Q*\theta p/P + 360*M*(Q-P)/P. \tag{13}$$

When equation (8) is satisfied, the following equation (14) results:

$$\theta q = Q*\theta p/P + Q*\Delta\theta + 360*M/P. \tag{14}$$

In order to uniquely establish equation (14), it is necessary that equation (14) not change according to the values of the respective variables.

FIG. 3 is a drawing that graphs equation (14) in order to facilitate an understanding thereof. In FIG. 3, θp and θq are plotted on the horizontal axis and the vertical axis, respectively, with respect to the parameters M and (Q*Δθ). The straight lines (a), (b) and (c) correspond to the values of θp and θq for the case where M=0 and (Q*Δθ)>0,(Q*Δθ)=0, and (Q*Δθ)<0, respectively. Similarly, the straight lines (d), (e) and (f) correspond to the values of θp and θq for the case where M=1 and (Q*Δθ)>0,(Q*Δθ)=0, and (Q*Δθ)<0. As can be readily appreciated from FIG. 3, in order for the M=0 graphs and the M=1 graphs not to intersect, it is necessary that the conditions of the following equation (15) be satisfied:

$$360/(2*Q*P) > \Delta\theta_{max}, \tag{15}$$

where Δθmax is the maximum value of Δθ allowed (i.e., the maximum shaft angle measurement range of the dual resolver 1).

As can be seen, equation (15) does not impose any restriction on the relative size relationship of the shaft angle multiples P and Q of the resolvers 2 and 4. Accordingly, the shaft angle multiple of either resolver 2 or resolver 4 may be larger, and the difference between them need only satisfy equation (8), in order to uniquely establish equation (14) and facilitate determination of the absolute rotation angle θ.

FIG. 4 is a table which sets forth the Δθ accuracy or resolution of the dual resolver 1 of the present invention, as determined by equation (15), for different values of P and Q that satisfy the condition of equation (8). As is clear from FIG. 4, in order to obtain a resolver measurement range of 5 degrees (or greater), which is a practical value for Δθ, it is necessary that there be a combination of P and Q values of 6 and 5 (or less), respectively. On the other hand, resolver measurement accuracy or resolution becomes greater the larger the shaft angle multiple. Therefore, in order to achieve a resolver measurement range of 5 degrees (or greater) for Δθ, it is optimal for there to be a combination of P and Q values of 6 and 5 (or 5 and 6), respectively. Of course, the optimal values of P and Q will depend upon the parameters and/or requirements of any given application, such as the Δθ parameter of the given application. In any event, the particular values of P and Q that are chosen are not limiting to the present invention, in its broader aspects. For example, if Δθ is two degrees, then the optimal P and Q values may be 10 and 9 (or 9 and 10), respectively. In such a case, the measurement accuracy or resolution of the resolver is commensurately greater than the illustrative case discussed above in which the P and Q values are 6 and 5 (or 5 and 6), respectively, but at the expense of a narrower resolver measurement range (i.e., 2 degrees versus 6 degrees).

With reference now to FIG. 5, there can be seen a functional block diagram of a shaft angle measurement device, according to an embodiment of the present invention, that incorporates the dual resolver 1 described hereinabove. As will be appreciated, the shaft angle measurement apparatus of the present invention is capable of measuring both the absolute rotation angle θ and the relative rotation angle Δθ.

With continuing reference to FIG. 5, the illustrative embodiment of the shaft angle measurement device of the present invention includes the dual resolver 1 producing shaft angle outputs 1a (Φp) and 1b (Φq); R/D converters 5A and 5B which receive and digitize the shaft angle outputs 1a and 1b of the resolver 1, respectively, and produce digital shaft angle outputs 5a, 5b (if necessary); and, a processor 6 which receives the digital shaft angle outputs 5a, 5b of the R/D converters 5A, 5B, respectively, and which determines the absolute shaft rotation angle θ and the relative shaft rotation angle Δθ of the dual resolver 1, in a manner described below. The R/D converters 5A and 5B and/or the processor 6 can be implemented as components of the dual resolver 1, or, alternatively, can be implemented as separate components of the shaft angle measurement device, either contained in the same or different housings. The processor 6 can be implemented as a dedicated or programmable microprocessor, microcomputer, or microcontroller, as a dedicated or programmable ASIC (Application Specific Integrated Circuit), and/or as other dedicated or programmable logic, such as FPGAs or FPLAs (Field Programmable Gate or Logic Arrays).

In a presently preferred embodiment, the processor 6 includes a memory device such as a ROM, EPROM, EEPROM, or the like, for storing programs for executing the processing steps necessary to implement the algorithms disclosed herein, and further including memory (e.g., a table look-up ROM) for storing a lookup table that contains pre-computed or pre-calculated values for at least some of the variables of the equations solved by the processor 6, to thereby minimize the processing overhead of the processor 6, and increase the processing speed thereof.

In operation, the illustrative embodiment of the shaft angle measurement apparatus of the present invention depicted in FIG. 5 works as follows. To begin with, the processor 6 determines the value of θq by substituting the values of 0, 1, . . . Q−1 for M in equation (12), with the resultant values being designated as θqm. The processor 6 also determines the values of Δθ with respect to the respective values of M according to equation (16). The processor 6 calculates the difference between the calculated value of θq obtained from equation (12) for Δθ=0 and the actually measured value of θq obtained by the dual resolver 1, designated as Φq, and considers that calculated difference value to constitute the actual value of Δθ. In particular, from among the different values of θqm obtained for different values of M, the processor 6 selects a value of θqm, designated as θqms, that satisfies equation (15), and sets the value of Δθ corresponding thereto as the measured value of Δθ, in accordance with the following equation (16):

$$\Delta\theta=(\Phi q-\theta qms)/Q. \quad (16)$$

The processor 6 then determines the absolute shaft rotation angle θ according to the following equation (17):

$$\theta=\Phi p/P+360*Mqms/P, \quad (17)$$

where Φp is the actually measured value of θp obtained by the dual resolver 1, and Mqms is the value of M when θqm=θqms.

The values of θqm for the different values of M can be calculated by the processor 6 according to the following equation (18):

$$\theta qm=\Phi p+72*M \text{ (where } M=0, 1, 2, 3, 4 \text{ (where } 4=Q-1, \text{ for the illustrative embodiment, in which } P=6, \text{ and } Q=5)). \quad (18)$$

The foregoing computation can be accelerated by storing each of the possible values of (72*M) in a look-up table stored in a ROM or other suitable memory device (not shown), thereby eliminating a multiplication step for each discrete calculation of θqm.

As described previously, the processor 6 determines the relative shaft rotation angle Δθ by solving equation (16) using a selected value of θqm, designated as θqms, that satisfies equation (15), i.e., Δθ=(Φq−θqms)/5 (where Q=5, for the illustrative embodiment). In addition, the processor 6 determines the absolute shaft rotation angle θ according to equation (17), i.e., θ=(Φp+360*Mqms)/5 (where Q=5, for the illustrative embodiment; and, Mqms is the value of M when θqm=θqms).

The foregoing computation can be accelerated by storing each of the possible values of (360*M) in a look-up table stored in a ROM or other suitable memory device (not shown), thereby eliminating a multiplication step, and enabling the calculations of θ and Δθ to be obtained by one division each.

Although various illustrative and presently preferred embodiments of the present invention have been described in detail hereinabove, it will be appreciated that the present invention encompasses various equivalents, variations, modifications, and alternative embodiments that may appear to those having ordinary skill in the pertinent art, with the benefit of the present disclosure.

What is claimed is:

1. A dual resolver device, comprising:
   a first resolver including a first rotary shaft; and
   a second resolver including a second rotary shaft;
   wherein the absolute value of a difference between a shaft angle multiple of the first resolver and a shaft angle multiple of the second resolver is 1.

2. The dual resolver device as set forth in claim 1, further comprising a torsion bar connecting the first and second rotary shafts, and wherein:
   the first resolver produces an output indicative of a rotation angle of the first rotary shaft; and,
   the second resolver produces an output indicative of a rotation angle of the second rotary shaft.

3. The dual resolver device as set forth in claim 2, further comprising means for determining an absolute shaft rotation angle of the dual resolver device in response to the first and second outputs, and the shaft angle multiples of the first and second resolvers.

4. The dual resolver device as set forth in claim 2, further comprising means for determining a relative shaft rotation angle of the dual resolver device in response to the first and second outputs, and the shaft angle multiples of the first and second resolvers.

5. The dual resolver device as set forth in claim 3, further comprising means for determining a relative shaft rotation angle of the dual resolver device in response to the first and second outputs, and the shaft angle multiples of the first and second resolvers.

6. The dual resolver device as set forth in claim 2, further comprising a processor that determines an absolute shaft rotation angle of the dual resolver device in response to the first and second outputs, and the shaft angle multiples of the first and second resolvers.

7. The dual resolver device as set forth in claim 2, further comprising a processor that determines a relative shaft rotation angle of the dual resolver device in response to the first and second outputs, and the shaft angle multiples of the first and second resolvers.

8. The dual resolver device as set forth in claim 6, further comprising a processor that determines a relative shaft rotation angle of the dual resolver device in response to the first and second outputs, and the shaft angle multiples of the first and second resolvers.

9. The dual resolver device as set forth in claim 6, wherein the processor determines the absolute shaft rotation angle of the dual resolver device by:
   solving the equation θq=(P*θp/P)+(360*M/P), for each of different values of M, using 0 and each integer between 0 and Q−1, inclusive, as the different values of M, to thereby produce a plurality of values θqm, where P is the shaft angle multiple of the first resolver, Q is the shaft angle multiple of the second resolver, θq is a calculated value of the rotation angle of the first rotary shaft, and θp is a calculated value of the rotation angle of the second rotary shaft;
   selecting from amongst the plurality of values of θqm, a value of θqms that satisfies the equation 360/(2*Q*P) > Δθmax, where Δθmax is the maximum value of Δθ allowed, and Δθ is a calculated value of the difference between the respective rotation angles of the first and second rotary shafts determined by solving the equation Δθ=(Φq−θqms)/Q, where Φq is the output of the first resolver; and
   by solving the equation θ=(Φp+360*Mqms)/Q, where Φp is the output of the second resolver, Mqms is the value of M when θqm=θqms, and θ is the absolute shaft rotation angle of the dual resolver device.

10. The dual resolver device as set forth in claim 9, wherein Δθ is the relative shaft rotation angle of the dual resolver device.

11. The dual resolver device as set forth in claim 7, wherein the processor determines the relative shaft rotation angle of the dual resolver device by:
   solving the equation θq=(P*θp/P)+(360*M/P), for each of different values of M, using 0 and each integer between 0 and Q−1, inclusive, as the different values of M, to thereby produce a plurality of values θqm, where P is the shaft angle multiple of the first resolver, Q is the shaft angle multiple of the second resolver, $\theta q$ is a calculated value of the rotation angle of the first rotary shaft, and $\theta p$ is a calculated value of the rotation angle of the second rotary shaft;

selecting from amongst the plurality of values of $\theta qm$, a value of $\theta qms$ that satisfies the equation $360/(2*Q*P) > \Delta\theta max$, where $\Delta\theta max$ is the maximum value of $\Delta\theta$ allowed, and $\Delta\theta$ is the relative shaft rotation angle of the dual resolver device; and determining the value of $\Delta\theta$ by solving the equation $\Delta\theta=(\Phi q-\theta qms)/Q$, where $\Phi q$ is the output of the first resolver.

12. The dual resolver device as set forth in claim 3, wherein the means for determining an absolute shaft rotation angle of the dual resolver device determines the absolute shaft rotation angle of the dual resolver device by:

solving the equation $\theta q=(P*\theta p/P)+(360*M/P)$, for each of different values of M, using 0 and each integer between 0 and Q−1, inclusive, as the different values of M, to thereby produce a plurality of values $\theta qm$, where P is the shaft angle multiple of the first resolver, Q is the shaft angle multiple of the second resolver, $\theta q$ is a calculated value of the rotation angle of the first rotary shaft, and $\theta p$ is a calculated value of the rotation angle of the second rotary shaft;

selecting from amongst the plurality of values of $\theta qm$, a value of $\theta qms$ that satisfies the equation $360/(2*Q*P) > \Delta\theta max$, where $\Delta\theta max$ is the maximum value of $\Delta\theta$ allowed, and $\Delta\theta$ is a calculated value of the difference between the respective rotation angles of the first and second rotary shafts determined by solving the equation $\Delta\theta=(\Phi q-\theta qms)/Q$, where $\Phi q$ is the output of the first resolver; and by solving the equation $\theta=((\theta p+360*Mqms)/Q$, where $\Phi p$ is the output of the second resolver, Mqms is the value of M when $\theta qm=\theta qms$, and $\theta$ is the absolute shaft rotation angle of the dual resolver device.

13. The dual resolver device as set forth in claim 12, wherein $\Delta\theta$ is the relative shaft rotation angle of the dual resolver device.

14. The dual resolver device as set forth in claim 4, wherein the means for determining a relative shaft rotation angle of the dual resolver device determines the relative shaft rotation angle of the dual resolver device by:

solving the equation $\theta q=(P*\theta p/P)+(360*M/P)$, for each of different values of M, using 0 and each integer between 0 and Q−1, inclusive, as the different values of M, to thereby produce a plurality of values $\theta qm$, where P is the shaft angle multiple of the first resolver, Q is the shaft angle multiple of the second resolver, $\theta q$ is a calculated value of the rotation angle of the first rotary shaft, and $\theta p$ is a calculated value of the rotation angle of the second rotary shaft;

selecting from amongst the plurality of values of $\theta qm$, a value of $\theta qms$ that satisfies the equation $360/(2*Q*P) > \Delta\theta max$, where $\Delta\theta max$ is the maximum value of $\Delta\theta$ allowed, and $\Delta\theta$ is the relative shaft rotation angle of the dual resolver device; and determining the value of $\Delta\theta$ by solving the equation $\Delta\theta=(\Phi q-\theta qms)/Q$, where $\Phi q$ is the output of the first resolver.

15. The dual resolver device as set forth in claim 2, wherein:

the first and second rotary shafts comprise different portions of a common rotary shaft;

the first resolver produces an output indicative of a rotation angle of the first rotary shaft; and, the second resolver produces an output indicative of a rotation angle of the second rotary shaft.

16. The dual resolver device as set forth in claim 1, wherein the sum of the shaft angle multiples of the first and second resolvers is $\geq 3$.

17. The dual resolver device as set forth in claim 1, wherein the sum of the shaft angle multiples of the first and second resolvers is $\geq 11$.

18. The dual resolver device as set forth in claim 9, wherein the sum of the shaft angle multiples of the first and second resolvers is $\geq 11$.

19. The dual resolver device as set forth in claim 11, wherein the sum of the shaft angle multiples of the first and second resolvers is $\geq 11$.

* * * * *